US012643380B2

(12) United States Patent
Yim et al.

(10) Patent No.: US 12,643,380 B2
(45) Date of Patent: Jun. 2, 2026

(54) THREE-DIMENSIONAL MEMORY DEVICE CONTAINING ETCH-STOP STRUCTURES AND SELF- ALIGNED INSULATING SPACERS AND METHOD OF MAKING THE SAME

(71) Applicants:HYUNDAI MOTOR COMPANY, Seoul (KR); Kia Corporation, Seoul (KR)

(72) Inventors: Chungsik Yim, Anyang-si (KR); Jaeseung Lee, Hwaseong-si (KR); Jinwoo Nam, Seoul (KR); Yonghyun Nam, Anyang-si (KR); Hyungin Yun, Seoul (KR); Kyuhoon Cho, Suwon-si (KR); Soo Bok Kim, Incheon (KR); Hyong Don Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 444 days.

(21) Appl. No.: 17/965,245

(22) Filed: Oct. 13, 2022

(65) Prior Publication Data

US 2023/0202271 A1 Jun. 29, 2023

(30) Foreign Application Priority Data

Dec. 27, 2021 (KR) ........................ 10-2021-0188088

(51) Int. Cl.
B60J 5/04 (2006.01)
E05D 7/04 (2006.01)
E05F 15/622 (2015.01)

(52) U.S. Cl.
CPC .......... B60J 5/0479 (2013.01); E05D 7/0423 (2013.01); E05F 15/622 (2015.01); B60J 2005/0475 (2013.01); E05Y 2900/531 (2013.01)

(58) Field of Classification Search
CPC ...................... B60J 5/0479; B60J 2005/0475; B60J 5/0477; E05D 7/0423; E05D 3/022; E05D 15/58; E05D 2015/485; E05F 15/622; E05F 15/603; E05Y 2900/531; E05Y 2201/406; E05Y 2201/434; E05Y 2201/696; E05Y 2201/684; E05Y 2201/692; E05Y 2201/708; E05B 83/38; E05B 85/20
See application file for complete search history.

(56) References Cited

U.S. PATENT DOCUMENTS

| | | | | |
|---|---|---|---|---|
| 2022/0389744 A1* | 12/2022 | Lee | .......................... | E05D 3/127 |
| 2022/0412142 A1* | 12/2022 | Lee | .......................... | E05D 15/58 |
| 2023/0202270 A1* | 6/2023 | Yim | .......................... | E05F 1/12 |
| | | | | 296/146.11 |
| 2023/0203863 A1* | 6/2023 | Yun | .......................... | B60J 5/0479 |
| | | | | 16/233 |
| 2023/0203867 A1* | 6/2023 | Yun | .......................... | E05D 15/58 |
| | | | | 296/146.1 |

FOREIGN PATENT DOCUMENTS

KR 10-2019-0028966 A 3/2019

* cited by examiner

*Primary Examiner* — Lori Lyjak
(74) *Attorney, Agent, or Firm* — MORGAN, LEWIS & BOCKIUS LLP

(57) ABSTRACT

In a door hinge device for the vehicle, in the vehicle without a B pillar, as the hinge slider connected to the hinge portion of the door moves in the diagonal direction of the vehicle body along the rail by the driving torque of the motor inside the case, each door may be independently opened or closed while securing the rotation trajectory of the door.

9 Claims, 10 Drawing Sheets

100

200

THREE-DIMENSIONAL MEMORY DEVICE CONTAINING ETCH-STOP STRUCTURES AND SELF- ALIGNED INSULATING SPACERS AND METHOD OF MAKING THE SAME

CROSS-REFERENCE TO RELATED APPLICATION

The present application claims priority to Korean Patent Application No. 10-2021-0188088 filed in the Korean Intellectual Property Office on Dec. 27, 2021, the entire contents of which is incorporated herein for all purposes by this reference.

BACKGROUND OF THE PRESENT DISCLOSURE

Field of the Present Disclosure

The present disclosure relates to a door hinge device for a vehicle. More particularly, the present disclosure relates to a door hinge device for a vehicle that enables an opening and closing operation of each door independently by securing a rotation trajectory by pushing a hinge part of a door to the outside of the vehicle body in a vehicle without a B pillar.

Description of the Related Art

In general, a vehicle door as a door that separates the inside and outside of the vehicle blocks external noise, rain, dust, wind, etc., and has an important function of absorbing an impact together with the side structure to safely protect occupants in an event of a side collision.

There are various types of vehicle doors, including special-purpose doors, but swing doors of a hinge-type are most often applied to passenger vehicles.

In general, the swing door refers to a door that opens to the outside of the vehicle body around a hinge axis provided to the vehicle body through a hinge bracket interposed therebetween, and has advantages of easy opening and closing and a simple structure, so maintenance and repair are easy.

On the other hand, in some vehicles, when the door is opened, an open feeling is large, and an opposing swing door is applied, which is advantageous for getting the passengers on and off.

These opposing swing doors are divided into a type without a B pillar and a type with a B pillar.

FIG. 1 is a side view showing a vehicle to which an opposing swing door according to an example of conventional art is applied, and FIG. 2 is a cross-sectional view showing a portion where a front door and a rear door are in contact in the vehicle of FIG. 1.

First, referring to FIG. 1 and FIG. 2, an example of the opposing swing door applied to the vehicle 100 without the B pillar is shown. In the front door 110, the hinge portion is provided at the front end of the front door 110, and in the rear door 120, the hinge portion is provided at the rear end of the rear door 120.

In the present opposing swing door, a latch portion LC is provided on one side of the front door 110 or the rear door 120 to maintain the locked state.

Furthermore, a seal S for air-tightness is provided between the rear end of the front door 110 and the front end of the rear door 120.

As described above, the opposing swing door of the vehicle 100 without the B pillar has a good open feeling when riding or leaving the vehicle or leisure activities, however during the opening and closing operation of the front door 110 and the rear door 120, there is a drawback in that the opening and closing order is predetermined, such as having to open or close the front door 110 first or later due to the overlapping rotation trajectory between the front door 110 and the rear door 120.

Accordingly, because the opening and closing order of the front door 110 and the rear door 120 is predetermined, there is a problem that the rear door 120 cannot be opened or closed alone.

FIG. 3 is a side view showing a vehicle to which an opposing swing door according to another example of a conventional art is applied, and FIG. 4 is a cross-sectional view showing a part where a front door and a rear door are in contact with each other in a vehicle of FIG. 3.

Referring to FIG. 3 and FIG. 4, an example of the opposing swing door applied to the vehicle 200 with the B pillar 230 is shown. Also, in the front door 210, a hinge portion is provided to the front end of the front door 210, and the hinge portion is provided to the rear end of the rear door 220 in the rear door 220.

In the present opposing swing door, a latch portion LC is provided between each one side of the front door 210 and the rear door 220, and the B pillar 230 to maintain the locking state.

Furthermore, a seal S for air-tightness is provided between the rear end of the front door 210 and the front end of the rear door 220, corresponding to the B pillar 230, and the B pillar 230.

Accordingly, because the opposing swing door of the vehicle 100 with the B pillar is configured so that the front door 210 and the rear door 220 rotate with respect to the B pillar 230, each of the independent operations of the opening and closing is possible, which has the advantage of a free operation order, however due to the application of the B pillar 230, there is a problem that the feeling of the openness is reduced when riding or leaving the vehicle or the leisure activities.

Accordingly, there is a difference in the sense of the openness of the opposing swing door and there is a difference in the opening and closing operation of the front door and the rear door depending on the presence or absence of the B pillar.

On the other hand, as described above, to solve the problem of the operation sequence of the front door 110 and the rear door 120 while maintaining the open feeling of the vehicle 100 without the B pillar, conventionally, as the door hinge device of the opposing swing door, there is an example in which the hinge device a gooseneck type is applied, however the hinge device of the present gooseneck type requires a lot of free space in the vehicle body width direction due to its shape characteristic, so it is difficult to configure the vehicle body layout.

Accordingly, to apply the opposing swing door to the vehicle without the B pillar, a door hinge device for realizing a new opening and closing structure is required.

The information disclosed in this Background of the present disclosure is only for enhancement of understanding of the general background of the present disclosure and may not be taken as an acknowledgement or any form of suggestion that this information forms the prior art already known to a person skilled in the art.

SUMMARY OF THE PRESENT DISCLOSURE

Various aspects of the present disclosure are directed to providing a door hinge device for a vehicle in which, in a vehicle without a B pillar, as a hinge slider connected to a hinge portion of a door moves in a diagonal direction of a vehicle body along a rail by a driving torque of a motor inside a case, each door may be independently opened or closed while securing a rotation trajectory of the door.

In one or a plurality of embodiments of the present disclosure, a door hinge device for a vehicle includes: a case provided in a diagonal direction toward an outside of a vehicle body on one side of the vehicle body corresponding to one end portion of a door and including a rail respectively configured in a length direction on upper and lower sides of the inside of the case; a hinge slider slidably provided along the rail through a slider inside the case and connected to a door hinge bracket fixed to the one end portion of the door through a hinge shaft outside the case; and a driving unit of which a nut bracket provided on a screw disposed along a length direction inside the case is connected to the hinge slider so that the hinge slider moves along the rail by driving of the motor.

One end portion of the door may consist of the front end of the front door or the rear end of the rear door.

The case may include: an outer case in which a guide slot for guiding the hinge slider along the length direction is formed on the upper and lower parts on the cross-section; and an inner case assembled with the outer case and to which the motor and the screw of the driving unit are fixed on the inner cross-section.

The rail may be disposed in the length direction along the inner coupling part of the inner case and the outer case, and may consist of an upper rail and a lower rail fixed to an inner upper surface and an inner lower surface of the inner case and the outer case, respectively.

The hinge slider may include: an inner hinge slider in which upper and lower sides thereof are slidably connected along the rail through the slider, respectively, inside the case; and an outer hinge slider which is integrally connected to the inner hinge slider outside the case through a guide slot formed on an exterior surface of the case and has the front hinged to the door hinge bracket through a hinge shaft.

The outer hinge slider may include: an upper outer hinge bar integrally connected to the upper one side of the inner hinge slider through an upper guide slot formed on the exterior surface of the case outside the case; a lower outer hinge bar integrally connected to the lower one side of the inner hinge slider through a lower guide slot formed under the exterior surface of the case outside the case; and an outer connection bar that interconnects the upper and lower outer hinge bars outside the case.

The door hinge bracket may include: an upper door hinge bracket fixed to the upper side of one end of the door and hinged to the front of the upper outer hinge bar through a hinge shaft; and a lower door hinge bracket fixed to the lower side of one end of the door and hinged to the front of the lower outer hinge bar through a hinge shaft.

The driving unit may include: a motor fixed on the inner cross-section of the case; a reducer engaged on the motor shaft of the motor to reduce and output torque of the motor; a screw disposed parallel to the rail and including a first end portion connected to the reducer and a second end portion provided rotatably on the inner cross-section of the case through a bearing member; and a nut bracket movably provided on the screw and including one side fixed to the hinge slider.

In the door hinge device for the vehicle according to an exemplary embodiment of the present disclosure of the present disclosure, as the hinge slider connected to the hinge portion of the door moves in the diagonal direction of the vehicle body along the rail by the driving torque of the motor inside the case, the rotation trajectory of the door is secured in advance, and in the instant state, it is possible to open and close both doors simultaneously, and to open and close one door alone.

Furthermore, after the hinge portion of the door slides automatically in the outer diagonal direction of the vehicle body along the hinge slider by the driving torque of the motor, the slide movement position of the hinge slider is maintained in a fixed state through the motor control, thereby facilitating the door opening and closing operation to be stable.

The door hinge device for the vehicle according to an exemplary embodiment of the present disclosure of the present disclosure, in an opposing swing door of the vehicle without the B pillar, maintains the advantage of a good open feeling when the occupant gets on or off, or does leisure activities, and has an effect of not being affected by a door opening/closing sequence even during the opening/closing operation of each door.

Furthermore, the door hinge device for the vehicle according to an exemplary embodiment of the present disclosure of the present disclosure is slim compared to a conventional gooseneck type of hinge device, a free space according to an operation radius is unnecessary, and there is an advantage that there is room for a vehicle body layout configuration.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
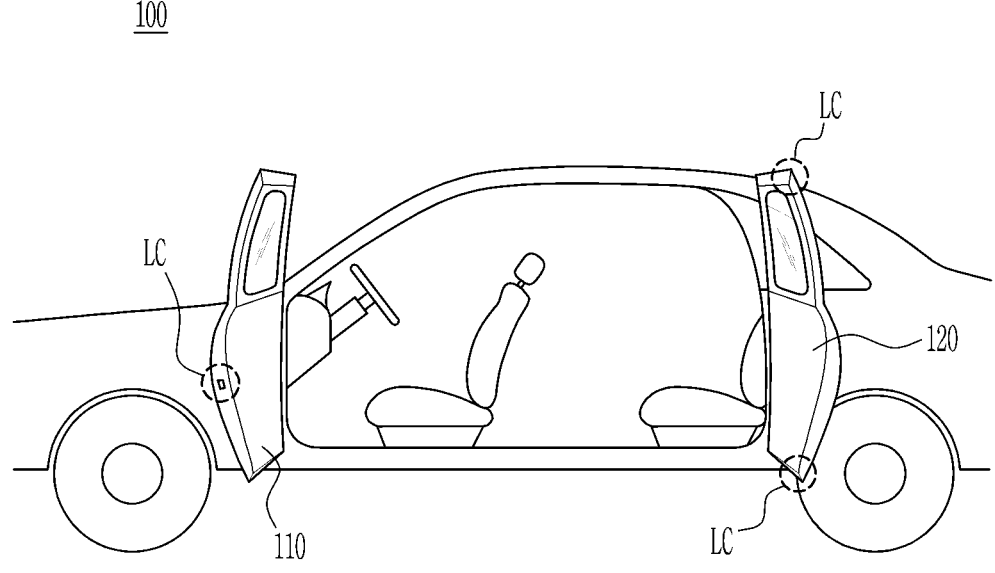
FIG. 1 is a side view showing a vehicle to which an opposing swing door according to an example of conventional art is applied.
Figure 2:
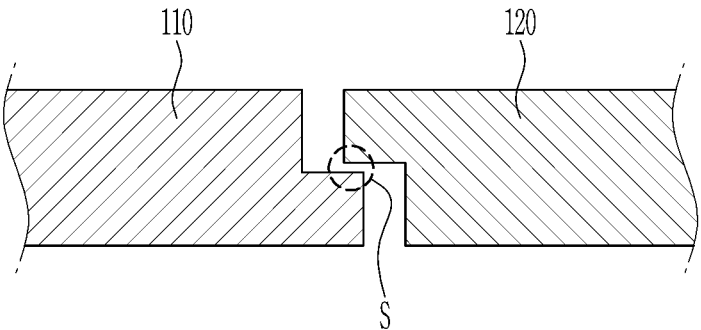
FIG. 2 a cross-sectional view showing a part where a front door and a rear door are in contact in the vehicle of FIG. 1.
Figure 3:
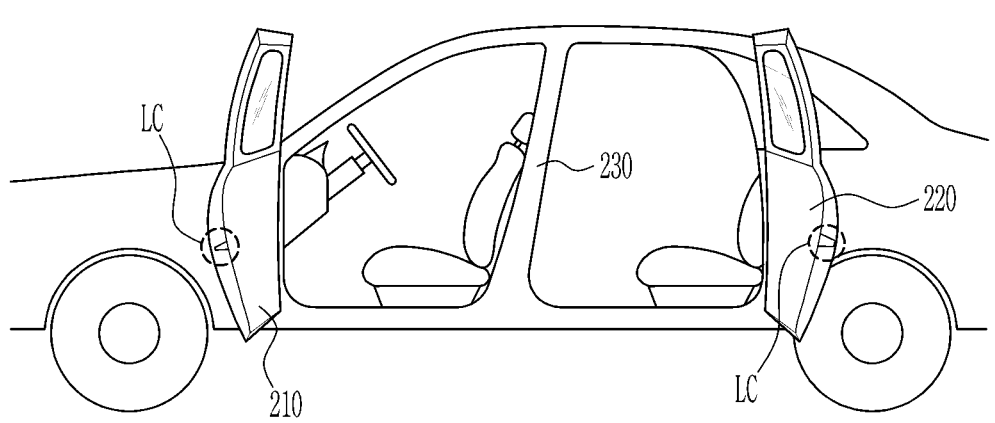
FIG. 3 is a side view showing a vehicle to which an opposing swing door according to another example of a conventional art is applied.
Figure 4:
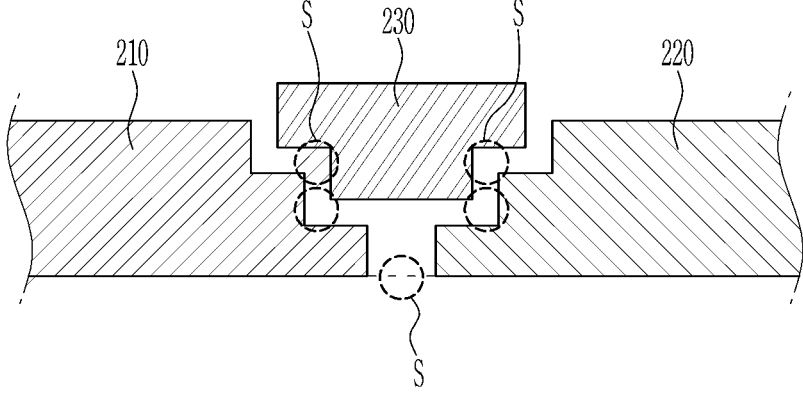
FIG. 4 is a cross-sectional view showing a part where a front door and a rear door are in contact with each other in a vehicle of FIG. 3.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE EMBODIMENTS

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, an exemplary embodiment of the present disclosure of the present disclosure will be described in detail with reference to the accompanying drawings.

However, because the size and thickness of each component shown in the drawing are arbitrarily indicated for convenience of explanation, the present disclosure is not necessarily limited to be shown in the drawing, and the thickness is enlarged or reduced to clearly express various parts and regions. Furthermore, to clearly describe an exemplary embodiment of the present disclosure of the present disclosure, parts irrelevant to the description are omitted.

Figure 5:
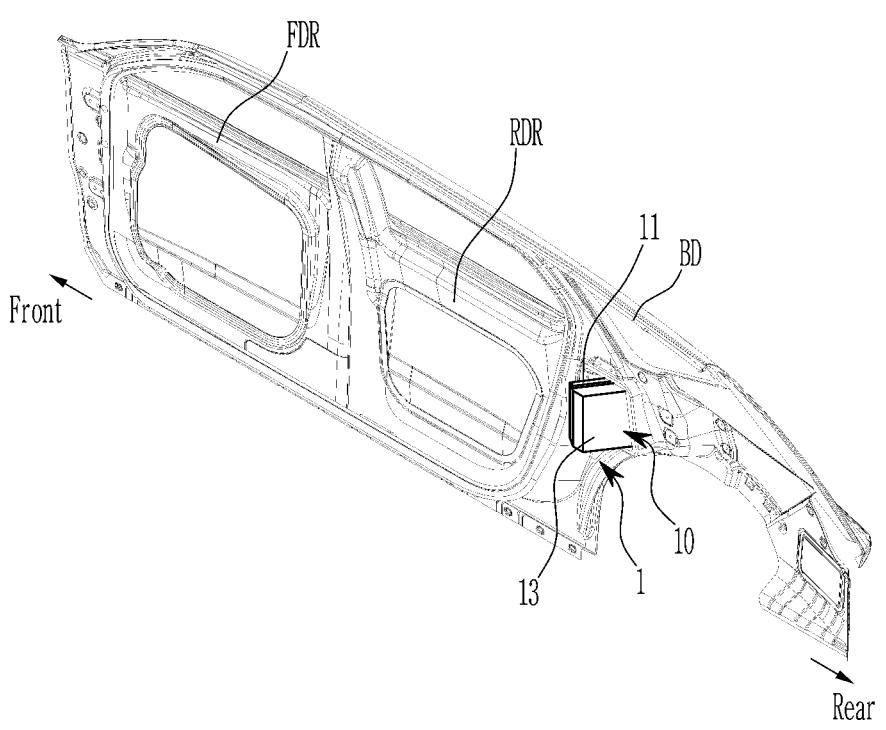
FIG. 5 is an inside perspective view of a vehicle door to which a door hinge device for a vehicle according to an exemplary embodiment of the present disclosure of the present disclosure is applied.

In describing an exemplary embodiment of the present disclosure of the present disclosure, for convenience of explanation, an upper left direction in FIG. 5 is defined as the front, and the lower right direction is defined as the rear. Furthermore, an example in which a door hinge device for a vehicle according to an exemplary embodiment of the present disclosure of the present disclosure is applied to a rear door of a rear of a passenger seat is described.

Figure 6:
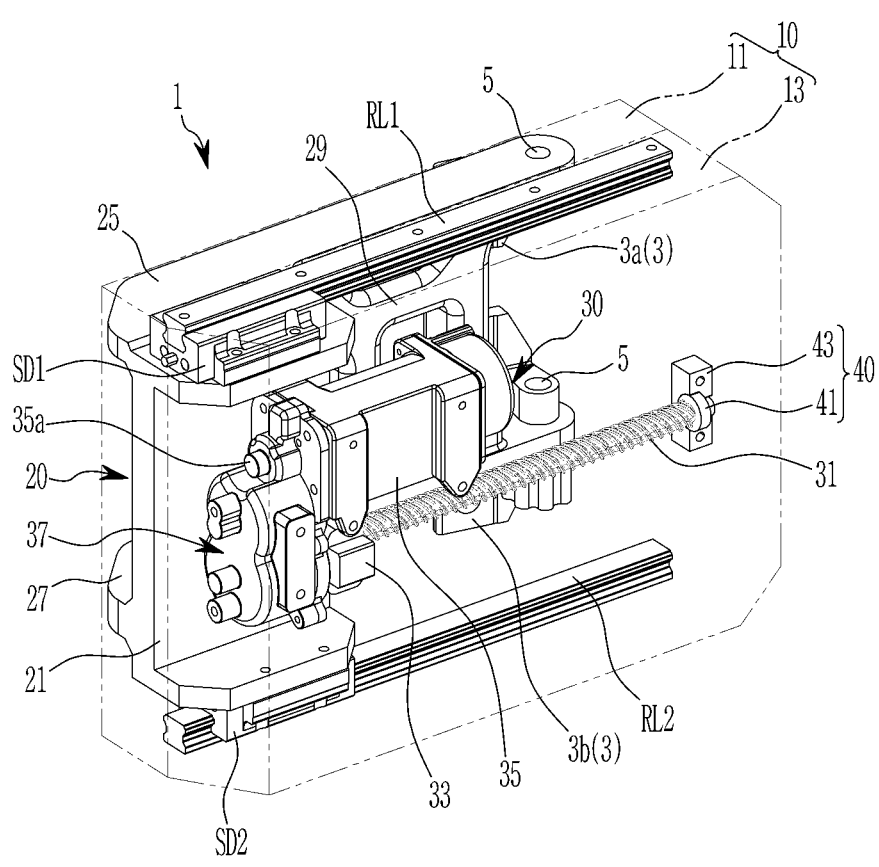
FIG. 6 and FIG. 7 are perspective views projecting a case of a door hinge device for a vehicle according to an exemplary embodiment of the present disclosure of the present disclosure.
Figure 7:
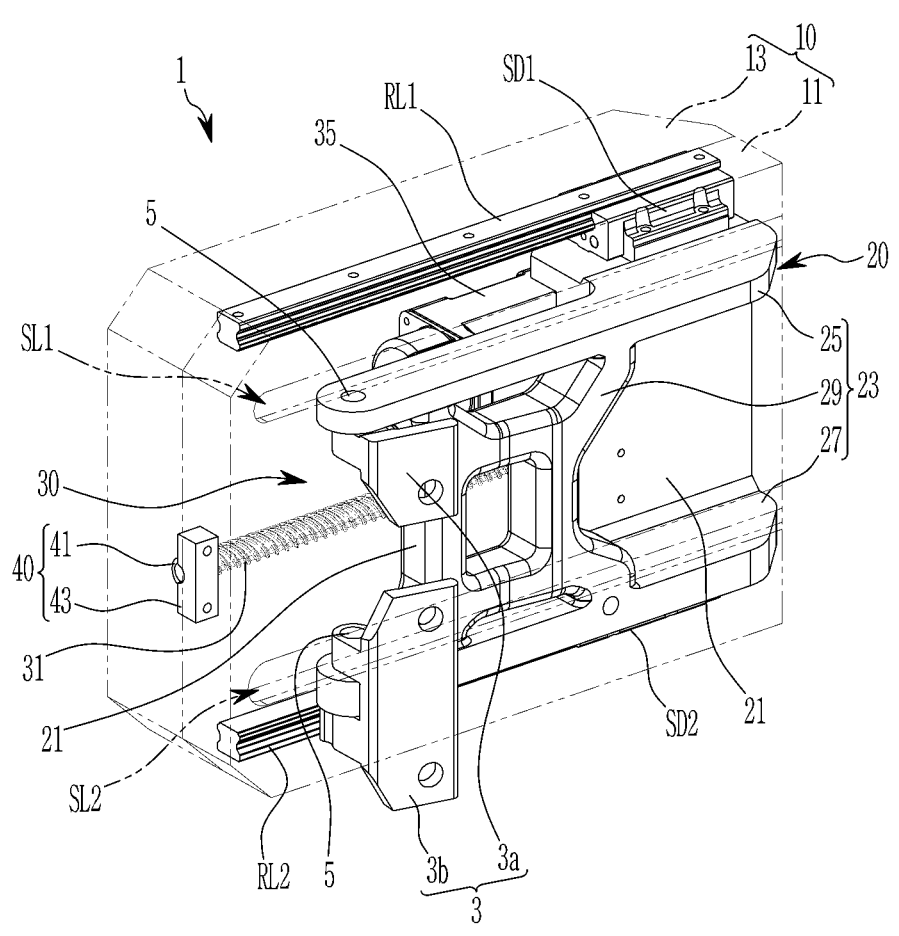

FIG. 5 is an inside perspective view of a vehicle door to which a door hinge device for a vehicle according to an exemplary embodiment of the present disclosure of the present disclosure is applied, and FIG. 6 and FIG. 7 are perspective views projecting a case of a door hinge device for a vehicle according to an exemplary embodiment of the present disclosure of the present disclosure.

The door hinge device for the vehicle 1 according to an exemplary embodiment of the present disclosure of the present disclosure is described as an example applied to the rear door of the rear of the passenger seat of the passenger vehicle without a B pillar, however it is not limited thereto, and it may be applied between the front door FDR and the vehicle body BD on both sides of the passenger vehicle without a B pillar, and between the rear door RDR and the vehicle body BD on both sides.

That is, during the opening/closing operation of the door, while the front door FDR or the rear door RDR moves to the outside of the vehicle body BD in each diagonal direction of the front of the vehicle body BD or the rear of the vehicle body BD to secure the rotation trajectory of each door, it enables the simultaneous opening/closing operation of both doors or independently for the opening/closing operation of one door.

Referring to FIG. 5 to FIG. 7, a door hinge device for a vehicle 1 according to an exemplary embodiment of the present disclosure of the present disclosure may include a case 10, a hinge slider 20, and a driving unit 30.

The case 10 is provided in a diagonal direction toward the outside of the vehicle body on one side of the vehicle body BD corresponding to one end of the door DR.

Here, the door DR may be a front door FDR or a rear door RDR, and may refer to them simultaneously. That is, in the case of the front door FDR, one end may be one side of the front end of the front door FDR, and in the case of the rear door RDR, one end may be one side of the rear end of the rear door RDR.

Also, one side of the vehicle body BD to which the front door FDR is provided means one side of the front of the vehicle body BD, and in the present case, the front door FDR may be provided in the diagonal direction toward the front outside of the vehicle body BD.

Furthermore, one side of the vehicle body BD on which the rear door RDR is provided means one side of the rear of the vehicle body BD, and in the present case, the rear door RDR may be provided in a diagonal direction toward the rear outside of the vehicle body BD.

Furthermore, in the case 10, two guide slots SL1 and SL2 are formed on the exterior surface, and an upper rail RL1 and a lower rail RL2 are provided along the length direction on the upper and lower sides of the interior, respectively.

That is, the case 10 is formed by assembling the outer case 11 and the inner case 13 together.

The outer case 11 faces the outside of the vehicle body BD, and the upper guide slot SL1 and the lower guide slot SL2 are formed in parallel to each other by cutting the upper and lower portions on the cross-section along the length direction, respectively.

The inner case 13 faces the interior of the vehicle body BD, and is assembled with the outer case 11.

Also, the upper rail RL1 is disposed along the inner coupling part of the outer case 11 and the inner case 13 in the length direction to be fixed to the inner upper surface, and the lower rail RL2 is disposed along the inner coupling part of the outer case 11 and the inner case 13 in the length direction to be fixed to the inner lower surface.

Also, between the outer case 11 and the inner case 13, the hinge slider 20 is provided through the upper rail RL1 and the lower rail RL2, and the driving unit 30 is provided on the inner cross-section of the inner case 13.

The hinge slider 20 is slidably installed along the upper rail RL1 and the lower rail RL2 through two sliders SD1 and SD2 inside the case 10, and is connected to the door hinge bracket 3 fixed to one end of the door DR through two guide slots SL1 and SL2 outside the case 10 through the hinge shaft 5.

That is, the hinge slider 20 includes an inner hinge slider 21 positioned inside the case 10 and an outer hinge slider 23 positioned outside the case 10.

The inner hinge slider 21 includes an upper side which is slidably connected to the upper rail RL1 through the upper slider SD1 on the inside between the outer case 11 and the inner case 13, and a lower side which is slidably connected to the lower rail RL2 through the lower slider SD2.

The outer hinge slider 23 is integrally connected to the inner hinge slider 21 through the upper and lower guide slots SL1 and SL2 at the outside of the outer case 11, and the front is hinged to the door hinge bracket 3 through the hinge shaft 5.

Here, the outer hinge slider 23 is formed of an upper outer hinge bar 25, a lower outer hinge bar 27, and an outer connection bar 29.

That is, the upper outer hinge bar 25 is integrally connected to the upper one side of the inner hinge slider 21 at the outside of the outer case 11 through the upper guide slot SL1 formed on the exterior surface of the outer case 11.

The lower outer hinge bar 27 is integrally connected to the lower one side of the inner hinge slider 21 at the outside of the outer case 11 through the lower guide slot SL2 formed under the exterior surface of the outer case 11.

Furthermore, the outer connection bar 29 is formed by interconnecting the upper and lower outer hinge bars 25 and 27 at the outside of the outer case 11.

Also, the door hinge bracket 3 includes an upper door hinge bracket 3a and a lower door hinge bracket 3b.

That is, the upper door hinge bracket 3a is fixed to the upper side of one end of the door DR and is hinged to the front of the upper outer hinge bar 25 through the hinge shaft 5.

Furthermore, the lower door hinge bracket 3b is fixed to the lower side of one end of the door DR and is hinged to the front of the lower outer hinge bar 27 through the hinge shaft 5.

Also, the driving unit 30 is configured so that a nut bracket 33 is provided on the screw 31 disposed along the length direction at the inside of the outer and inner cases 11 and 13, the nut bracket 33 is connected to the inner hinge slider 21, and then the hinge slider 20 slides and moves along the upper and lower rails RL1 and RL2 by the driving of the motor 35.

That is, the driving unit 30 includes the motor 35, the reducer 37, the screw 31, and the nut bracket 33.

The motor 35 is assembled and fixed to one side on the inner cross-section of inner case 13.

Here, the motor 35 may be a step motor capable of controlling a rotation speed and a rotating direction thereof.

The reducer 37 is configured on the motor shaft 35a of the motor 35 to reduce the torque of the motor 35 and output it.

The screw 31 is disposed parallel to the upper and lower rails RL1 and RL2 inside the case 10 so that one end is connected to the output side of the reducer 37, and the other end is rotatably provided on the inner cross-section of the inner case 13 through the bearing member 40.

Here, as for the bearing member 40, the bearing 41 that rotationally supports the other end of the screw 31 is engaged and fixed to the inner case 13 through the bearing block 43.

The nut bracket 33 is movably provided on the screw 31, and one side is fixed to the inner hinge slider 21.

That is, the nut bracket 33 transfers rotation power as forward and backward power so that the hinge slider 20 slides and moves along the upper and lower rails RL1 and RL2 while moving in the forward and backward directions on the rotating screw 31 by the rotation power of the motor 35.

Here, the screw 31 and the nut bracket 33 may be formed of a ball screw structure which is in contact cloudly through a plurality of balls between them.

Figure 8:
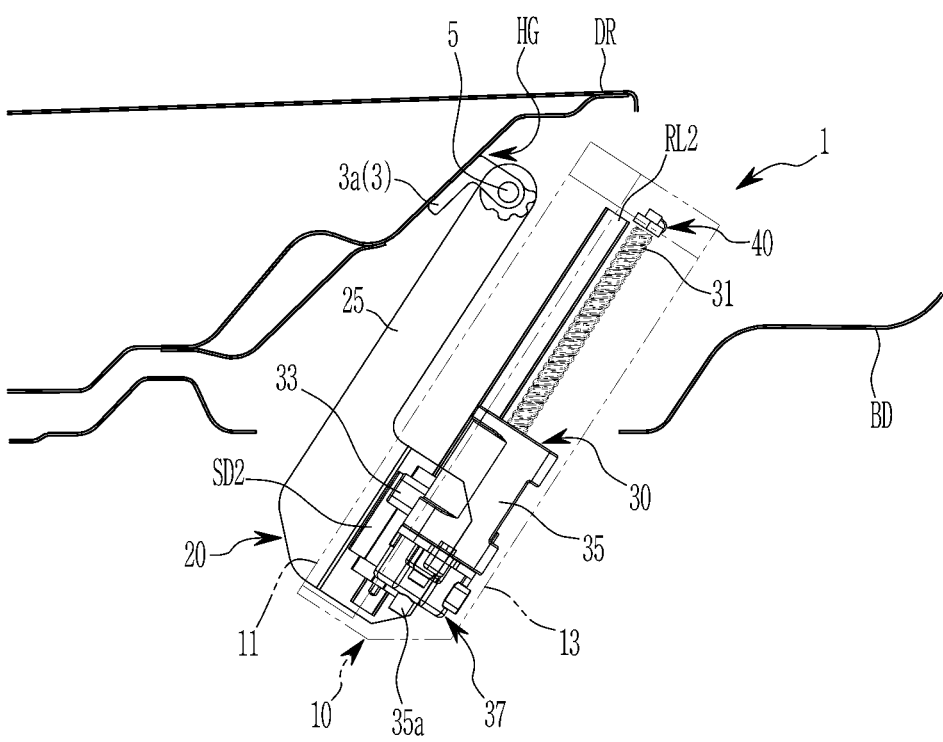
FIG. 8, FIG. 9 and FIG. 10 are flat cross-sectional views showing a step-by-step operation state of a door hinge device for a vehicle according to an exemplary embodiment of the present disclosure of the present disclosure.
Figure 9:
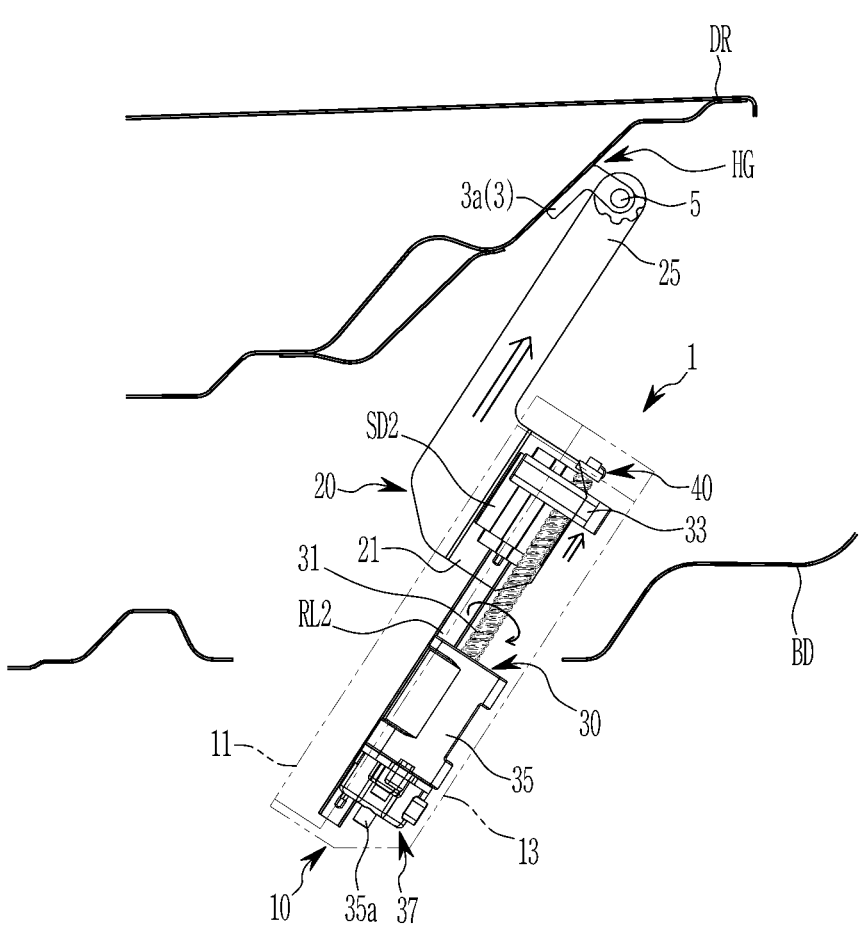
Figure 10:
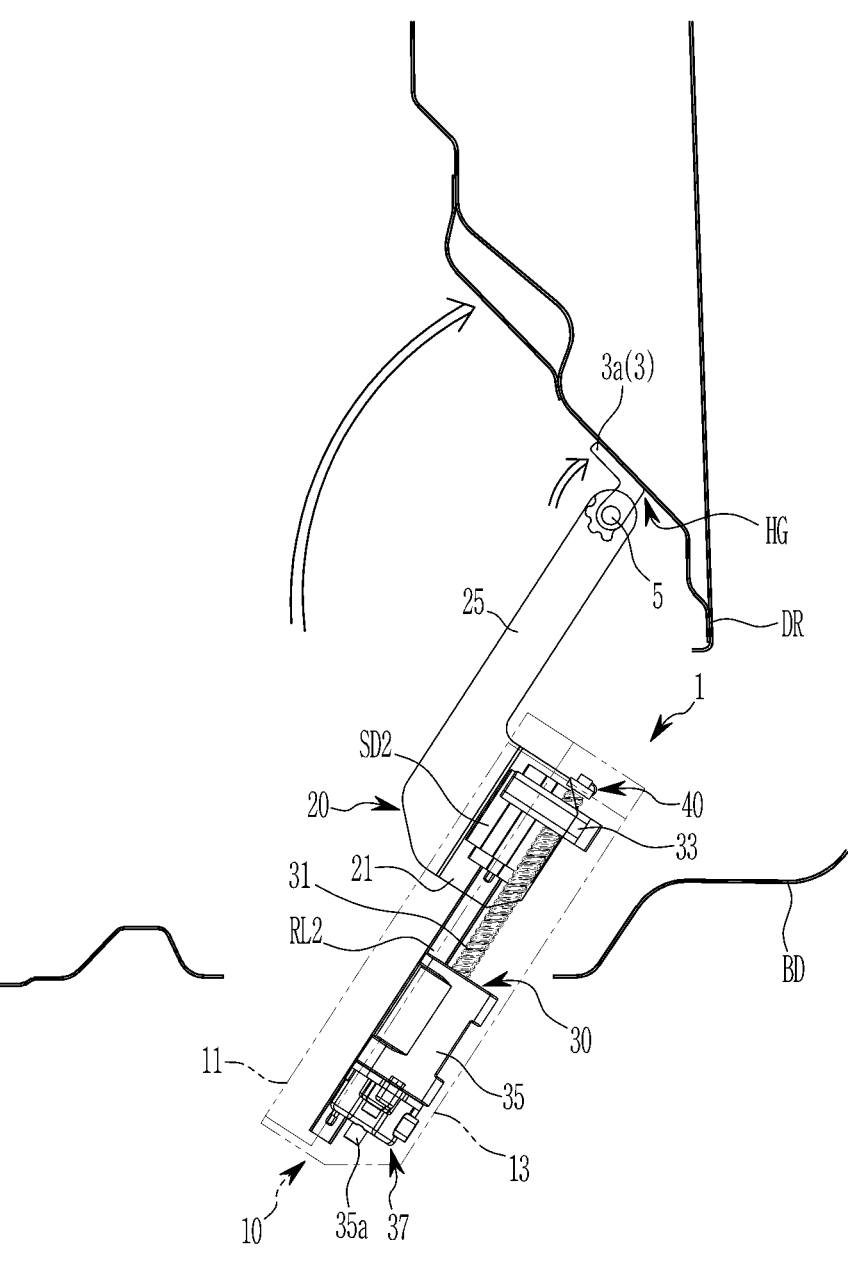

FIG. 8, FIG. 9 and FIG. 10 are flat cross-sectional views showing a step-by-step operation state of a door hinge device for a vehicle according to an exemplary embodiment of the present disclosure of the present disclosure.

Hereinafter, a detailed operation of the door hinge device for the vehicle according to an exemplary embodiment of the present disclosure of the present disclosure is described with reference to FIG. 8 to FIG. 10.

First, referring to FIG. 8, the door DR is in a closed state. In the present case, while the hinge shaft 5 connecting the door DR and the vehicle body BD moves in an inner diagonal direction of the vehicle body BD jointly with the hinge slider 20, one end portion of the door DR is in a position where the door DR maintains the closed state Referring to FIG. 9, as described above, in the closed state of the door DR, to open the door DR, first, the motor 35 is driven to rotate the screw 31 through the reducer 37. Accordingly, the nut bracket 33 connected on the screw 31 moves along the screw 31 in the outer diagonal direction of the vehicle body BD.

Accordingly, the hinge slider 20 fixed and connected to the nut bracket 33 slides and moves along the upper and lower rails RL1 and RL2 together with the nut bracket 33 in the outer diagonal direction of the vehicle body BD.

In the present case, the hinge slider 20 moves the upper and lower door hinge brackets 3a and 3b respectively hinged to the fronts of the upper and lower outer hinge bars 25 and 27 of the outer hinge slider 23 through the hinge shaft 5 in the outer diagonal direction of the vehicle body BD.

Accordingly, as the hinge portion HG with the vehicle body BD moves in the outer diagonal direction of the vehicle body BD, the door DR secures the rotation trajectory without interference with the vehicle body BD or the other door DR.

Referring to FIG. 10, as above-described, when the door DR is opened with the rotation trajectory of the door DR secured, the door DR is opened around the hinge shaft 5 without interference.

On the other hand, the operation to close the door DR is performed opposite to the operation to open the door DR as described above, and the detailed operation description is omitted.

Accordingly, in the door hinge device for the vehicle 1 according to an exemplary embodiment of the present disclosure of the present disclosure, as the hinge slider 20 connected to the hinge portion HG connected to the door DR slides and moves in the outer diagonal direction of the vehicle body BD along the upper and lower rails RL1 and RL2 by the driving torque of the motor 35 inside the case 10, it is possible to open and close both doors DR simultaneously, and to independently open and close one door DR by maintaining the rotation trajectory of door DR in advance.

Also, after the hinge portion HG of the door DR automatically slides and moves along the hinge slider 20 in the outer diagonal direction of the vehicle body BD by the driving torque of the motor 35, the slide movement position of the hinge slider 20 may be maintained in the fixed state through the control of the motor 35, and accordingly, the door opening and closing operation may be stably achieved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door hinge apparatus for a vehicle, the door hinge apparatus comprising:

a case provided in a diagonal direction toward an outside of a vehicle body on one side of the vehicle body corresponding to one end portion of a door and including a rail respectively configured in a length direction on upper and lower sides of an inside of the case;

a hinge slider slidably provided along the rail through a slider inside the case and connected to a door hinge bracket fixed to the one end portion of the door through a hinge shaft outside the case; and a driving unit including a nut bracket, a screw and a motor, wherein the nut bracket provided on the screw disposed along a length direction inside the case is connected to the hinge slider so that the hinge slider moves along the rail by driving of the motor.

2. The door hinge apparatus of claim 1, wherein the end portion of the door includes a front end portion of a front door or a rear end portion of a rear door in the vehicle.

3. The door hinge apparatus of claim 1, wherein the case includes:

an outer case in which a guide slot for guiding the hinge slider along the length direction is formed on upper and lower portions on a cross-section thereof; and an inner case mounted with the outer case and to which the motor and the screw of the driving unit are fixed on an inner cross-section thereof.

4. The door hinge apparatus of claim 3, wherein the rail is disposed in the length direction along an inner coupling portion of the inner case and the outer case.

5. The door hinge apparatus of claim 3, wherein the rail includes an upper rail and a lower rail fixed to an inner upper surface and an inner lower surface of the inner case and the outer case, respectively.

6. The door hinge apparatus of claim 1, wherein the hinge slider includes:

an inner hinge slider in which upper and lower sides thereof are slidably connected along the rail through the slider, respectively, inside the case; and an outer hinge slider which is integrally connected to the inner hinge slider outside the case through a guide slot formed on an exterior surface of the case and has the front hinged to the door hinge bracket through a hinge shaft.

7. The door hinge apparatus of claim 6, wherein the guide slot includes an upper guide slot and a lower guide slot, and wherein the outer hinge slider includes:

an upper outer hinge bar integrally connected to an upper one side of the inner hinge slider through the upper guide slot formed on the exterior surface of the case outside the case;

a lower outer hinge bar integrally connected to a lower one side of the inner hinge slider through the lower guide slot formed under the exterior surface of the case outside the case; and an outer connection bar that interconnects the upper and lower outer hinge bars outside the case.

8. The door hinge apparatus of claim 7, wherein the door hinge bracket includes:

an upper door hinge bracket fixed to an upper side of the one end portion of the door and hinged to the front of the upper outer hinge bar through a hinge shaft; and a lower door hinge bracket fixed to a lower side of the one end portion of the door and hinged to the front of the lower outer hinge bar through a hinge shaft.

9. The door hinge apparatus of claim 1, wherein the driving unit includes:

the motor fixed on an inner cross-section of the case;

a reducer engaged on the motor shaft of the motor to reduce and output a torque of the motor;

the screw disposed parallel to the rail and including a first end portion connected to the reducer and a second end portion provided rotatably on an inner cross-section of the case through a bearing member; and a nut bracket movably provided on the screw and including one side fixed to the hinge slider.

* * * * *